United States Patent Office 2,862,954
Patented Dec. 2, 1958

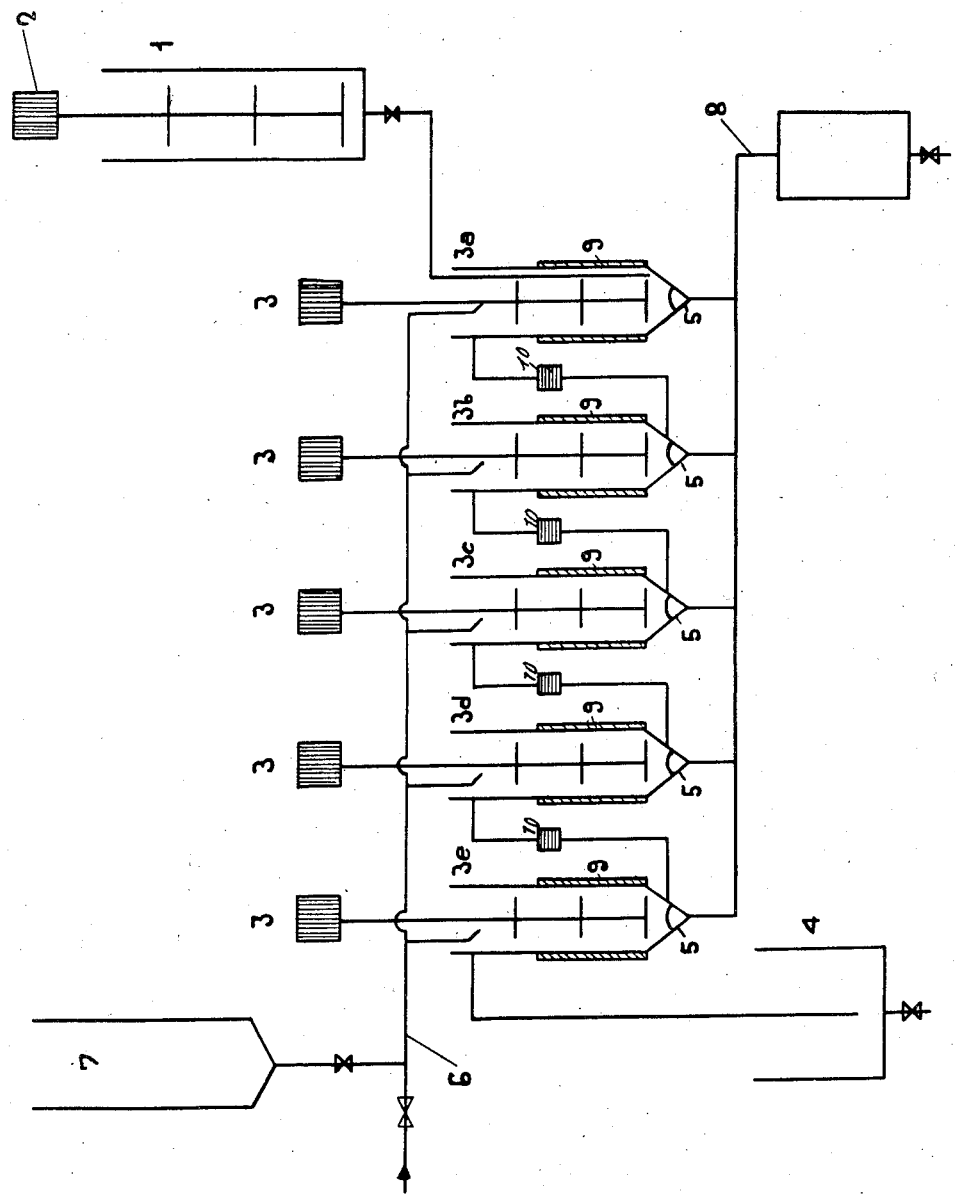

2,862,954

PROCESS FOR PREPARING ω-CYANO-CARBOXYLIC ACID AMIDES

Clau Berther, Chur, Switzerland, assignor to Inventa A. G. Fuer Forschung und Patentverwertung, Zurich, Switzerland Application May 22, 1956, Serial No. 586,567

Claims priority, application Switzerland May 26, 1955

4 Claims. (Cl. 260—465.4)

The present invention relates to a process for preparing ω-cyano-carboxylic acid amides.

It is known to prepare lactams by a simple method from ω-cyano-alkyl-carboxylic acids, their amides, or esters with hydrogen in the presence of hydrogenation catalysts.

The present invention relates to a process of preparing ω-cyano-carboxylic acid amides by one-sided saponification of the corresponding di-nitriles. The expression "one-sided" is intended to convey that of the two nitrile groups one only undergoes saponification.

It is known that the nitrile, e. g. of adipic acid can be so saponified by means of hydrogen peroxide and potassium hydroxide in acetone, whereby one nitrile group only is reacted and ω-cyano-valerianic acid amide is obtained. However, the yield of the product obtained by this method is only about 30% of the theoretical amount (see Wiley and Morgan, J. Org. Chem., 1950, vol. I, page 800).

It has now been discovered that not only adipic acid nitrile, but all the aliphatic di-nitriles having more than 1 carbon atom between the two nitrile groups, can undergo one-sided saponification with the aid of anion exchangers, so as to yield the corresponding ω-cyanocarboxylic acid amides.

This one-sided saponification preferably occurs by adding the di-nitriles in an aqueous emulsion to the anion exchanger. Before reaction sets in, the exchanger is activated with a strong base in a conventional manner. It is also possible to carry out the reaction with solutions of the di-nitriles in aqueous alcohol; the yields will, however, be smaller in this case.

One way of carrying out the process is to treat, for instance a suspension of 1 part di-nitrile and 6 parts of water with the exchanger for several minutes up to several hours at about 75° C. During the reaction an effective stirring device or a vibration mixer is used in a mixing vessel. After the reaction has been carried out, the ion exchanger is filtered off and washing with hot alcohol is carried out repeatedly. The filtrate is evaporated together with the rinsing alcohol, the residue is filtered while hot from precipitated di-carboxylic acid di-amide, and rectified in vacuo. When a conversion of 60% of the di-nitrile occurs, the yields of ω-cyanocarboxylic acid amide are up to 80% of the theoretical value.

The reaction temperature depends on the stability and activity of the ion exchanger and lies therefore between 20°–100° C. In the reaction smaller amounts of the acid saponification products such as di-carboxylic acids and nitrile acids are sometimes formed, which, of course, are bound by the basic groups of the exchanger. The activity of the exchanger is thereby reduced. It may, however, be very simply regenerated by a strong base, so that a continuous operation of the process becomes possible, as will be explained more fully with reference to the accompanying drawing in which an apparatus for carrying out the process according to the invention is diagrammatically illustrated.

As shown in the drawing, a mixing vessel 1 is provided, which is equipped with an effective vibration mixer 2; the mixing vessel is charged with a mixture of adipic acid nitrile and water in the ratio 1:6. Of the emulsion so prepared, 177 parts by volume are hourly introduced into a reaction vessel 3a. Vessels 3a, 3b, 3c, 3d, and 3e are likewise provided with vibration mixers 3 and charged with 100 parts b. vol. of anion exchanger per vessel. The temperature is maintained at the desired level in the reaction vessels by heating jackets 9, which may be electrically operated. The vibrating mixers, with which the reaction vessels are equipped, are actuated in such a manner that in each vessel at the overflow to the next vessel a separation will occur between ion exchanger and water. The overflow is made to pass from one vessel to the next one by pumps 10 at the bottom of each vessel and is withdrawn from the last vessel 3e into a container 4, the amount being equal to the one delivered into the first reaction vessel 3a. The reaction product collected in container 4 is evaporated and distilled off. With the mentioned amount of 177 parts b. w. of di-nitrile, the yield will be between 65 and 70%. This corresponds to about 80% of the actually converted di-nitrile. The unconverted di-nitrile is supplemented by a fresh amount of di-nitrile and water, so as to bring it up to the ratio of the original starting mixture and is returned to the mixing vessel 1.

For regenerating the exchanger as required—and as indicated by the decreasing output—the content of all the reaction vessels is sucked off over frits 5 by a vacuum line 8. In a subsequent operation, the filtrate is used for filling reaction vessels 3a to 3e once more. The exchanger is thoroughly rinsed with water by way of line 6 and is dried in vacuo. It is then used for recharging mixing vessel 1 in which the original starting mixture is obtained once more by introduction of di-nitrile.

By titration it will be found to what extent the capacity of the exchanger has decreased. Then such an amount of 2% basic liquid will be added from vessel 7 over line 6, as will be required for dissolving the acid liquid adhering to the exchanger. The solution is then sucked off, the exchanger is rinsed with water, and the filtrate evaporated in order to obtain the salts of the acid components.

As by-products of the one-sided saponification leading to the ω-cyanocarboxylic acid amides, some di-amides will likewise be obtained. These may be reconverted into di-nitriles in a known manner. This is most easily accomplished with the adipic nitrile, the nitrile which is the most important in the process according to the invention.

I may use for carrying out the one-sided saponification of di-nitriles all anion exchangers as ion exchangers, particularly those having a strong basic group. Very suitable are, above all, the Amberlites IRA 400 and IRA 410 (trademark). Furthermore, Dowex 2 and Permutit ES (both trademarks). These exchangers have sufficient heat stability, which is an important feature, more particularly in continuous operation. Amberlite IRA 400 and IRA 410 are exchangers with an aromatic matrix and a quaternary ammonium base as active group. Dowex 2 and Permutit ES have a polystyrene type matrix and likewise quaternary ammonium bases as active groups (compare W. Buser, Chimia 4, page 93, 1955).

The invention will now be more fully described in a number of examples, but it should be understood that these are given by way of illustration and not of limitation, and that many changes in the details can be made without departing from the spirit of the invention.

Example 1

54 parts b. w. of adiponitrile are emulsified by means of a vibration mixer with 300 parts of water and 500 parts b. vol. of activated Amberlite IRA 400 and then treated for 2 hours at 75° C. The mass is then filtered, while hot, and the exchanger is twice washed with 200 parts b. vol. of hot alcohol. The solution is then evaporated, is filtered, while hot, from the precipitated adipo-amide, and distilled in vacuo. 68% of adiponitrile are converted, the yield in ω-cyanovaleric acid amide being 80%.

Example 2

54 parts b. w. of adiponitrile are treated according to Example 1 with the difference that activated Amberlite IRA 410 is used as exchanger and the reaction takes place at 60° C. for 2 hours. The conversion is 60% and the yield in ω-cyanovaleric acid amide 81% of the theoretical amount.

Example 3

47 parts b. w. of glutaric acid di-nitrile are emulsified with 300 parts of water and 500 parts b. vol. of activated Amberlite IRA 400 and then treated for 2 hours at 70° C. The mass is then filtered while hot and washed several times with hot alcohol, whereupon the solution is evaporated and distilled in vacuo. The conversion amounts to 61%, the yield in ω-cyanobutyric acid amide is 70% of the theoretical amount.

Example 4

40 parts b. w. of succinic acid di-nitrile are reacted as described in Example 3. 55% of the di-nitrile is converted and the yield in ω-cyanopropionic acid amide is 65% of the theoretical amount.

Example 5

61 parts b. w. of pimelic acid di-nitrile are emulsified with 300 parts of water and 500 parts b. vol. of activated Amberlite IRA 400 and reacted at 80° C. for 3 hours. The mass is then filtered while hot and washed several times with alcohol. The solution is thereafter evaporated and the residue distilled in vacuo. 85% of di-nitrile are converted and the yield in ω-cyanocaproic acid amide (F: 90° C., B. P. $_{0.9}$=170—180° C. is 70%.

Example 6

68 parts b. w. of suberic acid di-nitrile are treated as described in Example 5. 45% are converted, and the yield in ω-cyanoenanthic acid amide is 60% (F: 76° C., B. P. $_{0.3}$=155–160° C.).

Example 7

54 parts of adiponitrile b. w. are saponified as described in Example 1. The exchanger, however, is Dowex 2. 40% are converted and the yield of amidonitrile is 45%.

Example 8

54 parts b. w. of adiponitrile are saponified as described in Example 1. As exchanger, 500 vol. parts of activated Permutite is used. 48% are converted, the yield in ω-cyanovaleric acid amide being 55% of the theoretical amount.

Example 9

In a mixing vessel 1, provided with vigorously acting vibration mixer 2, a mixture of adiponitrile and water is prepared with the ratio 54:300. Of this emulsion, 177 parts by volume are passed hourly into the reaction vessel 3a. The vessels 3a, 3b, 3c, 3d and 3e, which are also provided with vibration mixers 3, are filled with 100 parts b. vol. of activated Amberlite IRA 400 and 100 parts of water. Jackets 9 are heated by electrical means to a temperature which will maintain the contents in the reaction vessels at 75° C. The vibration mixers are now operated with such a manner that in each reaction vessel at the passage to the next vessel a separation between exchangers and water will take place. The overflow is pumped by means of pumps 10 at the bottom into the adjacent reaction vessel and is sucked off from vessel 3e into the container 4, the hourly withdrawal being 177 parts b. vol., which corresponds to the hourly input into reaction vessel 3a. The reaction product collected in container 4 is distilled. The hourly quantity of converted adiponitrile is 18.36 parts, corresponding to 68% and the yield in ω-cyanovaleric acid amide amounts to 80% of the converted di-nitrile. The unconverted adipic acid nitrile is filled into the emulsion vessel 1 after having been brought up to the original mixture by addition of fresh di-nitrile and water.

For regenerating the exchanger as required—and as indicated by the decreasing output—the content of all the reaction vessels is sucked off over frits 5 by a vacuum line 8. In a subsequent operation, the filtrate is used for filling reaction vessels 3a to 3e once more. The exchanger is thoroughly rinsed with water by way of line 6 and is dried in vacuo. It is then used for recharging mixing vessel 1 in which the original starting mixture is obtained once more by introduction of di-nitrile.

By titration it will be found to what extent the capacity of the exchanger has decreased. Then such an amount of 2% basic liquid will be added from vessel 7 over line 6, as will be required for dissolving the acid liquid adhering to the exchanger. The solution is then sucked off, the exchanger rinsed with water and the filtrate evaporated in order to obtain the sodium salts of the acid components.

What I claim is:

1. A process for preparing ω-cyanocarboxylic acid amides which comprises saponifying saturated aliphatic ω,ω'-dinitriles, whose nitrile groups are separated by at least 2 carbon atoms, by means of an anion exchanger in an aqueous medium at temperatures ranging from 20–100° C., the concentration of the dinitriles being from 15–25%.

2. The process according to claim 1, wherein the saponification is carried out at a temperature from 60–80° C.

3. The process according to claim 1, wherein the ω,ω'-dinitriles are treated with the anion exchanger in an aqueous-alcoholic solution.

4. The process according to claim 1, wherein the saponification of the ω,ω'-dinitriles is carried out continuously.

References Cited in the file of this patent

UNITED STATES PATENTS 2,658,070     Schmidle et al. _____ Nov. 3, 1953

OTHER REFERENCES

Galat: Jour. Amer. Chem. Soc., vol. 70, p. 3945 (1948).

Wiley et al.: Jour. Org. Chem., vol. 15, pp. 800–1 (1950).

Kunin: Ion Exchange Resins (1952), pp. 138–139.

Nachod et al.: Ion Exchange Technology, p. 282 (1956).